United States Patent [19]

Liu

[11] Patent Number: 4,630,503
[45] Date of Patent: Dec. 23, 1986

[54] PEDAL LINK ASSEMBLY FOR BICYCLE

[76] Inventor: King Liu, 19, Shun-Fan Road, Ta-Cha Town, Taichung Hsien, Taiwan

[21] Appl. No.: 784,102

[22] Filed: Oct. 4, 1985

[51] Int. Cl.⁴ ............................................. G05G 1/14
[52] U.S. Cl. ................................... 74/594.2; 74/594.1
[58] Field of Search ................. 74/594.1, 594.2, 594.3, 74/594.4, 594.5

[56] References Cited

U.S. PATENT DOCUMENTS

| 521,363 | 6/1894 | Bishop | 74/594.2 |
| 3,039,791 | 6/1962 | Horowitz et al. | 74/594.1 |
| 3,081,645 | 3/1963 | Bergfors | 74/594.1 |
| 3,648,542 | 3/1972 | Perotti et al. | 74/594.1 |
| 3,919,898 | 11/1975 | Sugino | 74/594.2 |
| 4,331,043 | 5/1982 | Shimano | 74/594.2 |

FOREIGN PATENT DOCUMENTS

| 2501615 | 9/1982 | France | 74/594.1 |
| 5957 | of 1894 | United Kingdom | 74/594.2 |

Primary Examiner—Gary L. Smith
Assistant Examiner—Vinh Luong
Attorney, Agent, or Firm—Holman & Stern

[57] ABSTRACT

A transmission mechanism with a novel crank and plastic-moulded gear comprising a crank member with a screw opening at one end and a larger head portion at another, and a transmission gear made of wear-resistant plastic material and incorporated with an inside gearing member through an injection moulding operation closely coupled with the head portion of the crank member so that the plastic-moulded transmission gear is always kept at its axis center without either wobbling or producing any noise during its rotation.

1 Claim, 9 Drawing Figures

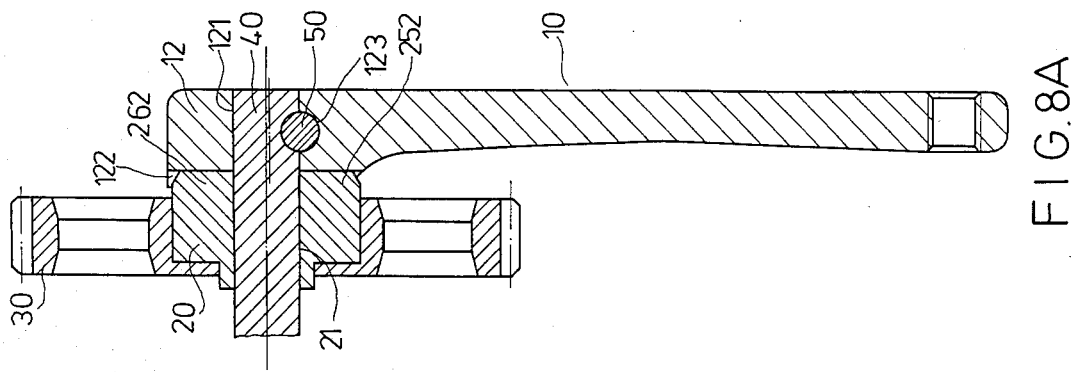
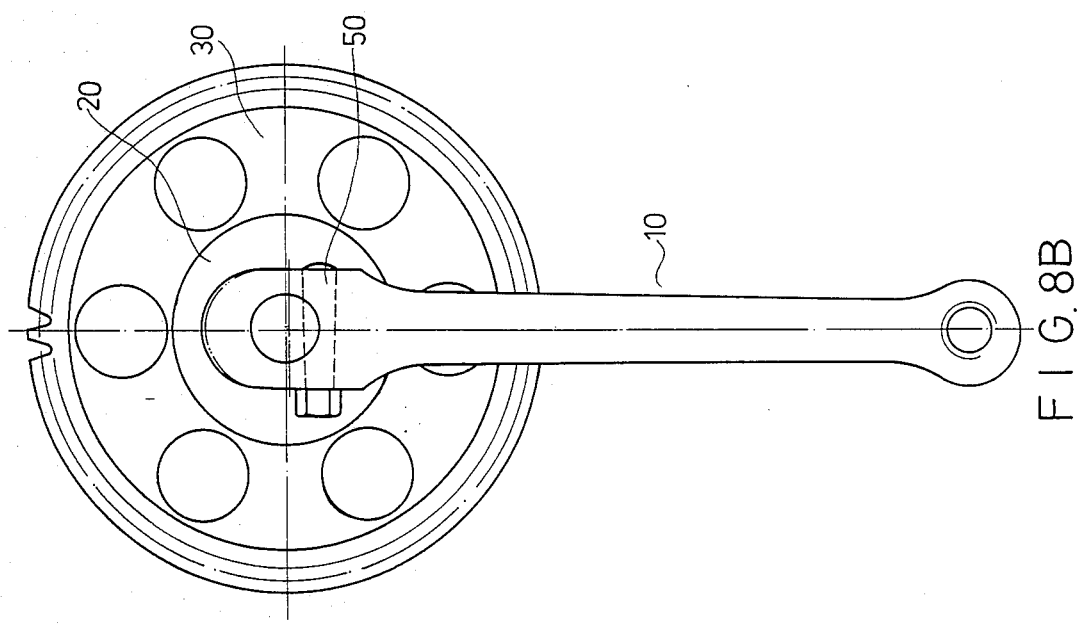

PEDAL LINK ASSEMBLY FOR BICYCLE

BACKGROUND OF THE INVENTION

This invention is related to a transmission mechanism, particularly to that type having a new crank matched with a plastic-moulded gear for use on gymnastic bicycles.

Tranditionally, transmission mechanisms used in gymnastic bicylces are as that shown in FIG. 1. The structure of the known transmission mechanism is usuaslly formed by rigidly connecting a metal gear 1 with a crank 2 through a transmission mandrel 3 which is axially secured within a central axle position of the gear 1 and the crank 2. In this disposition an arch-shaped notch 3a formed at the head portion of the transmission mandrel 3 is parallely aligned with a through aperture 2a which is located across the horizontal axle position of the crank 2, and a dowel pin 4 with a longitudinally inclined portion is inserted into the through aperture 2a and closely engaged with the arch-shaped notch 3a so as to force the crank 2 and the mandrel 3 to be tightly connected to perform the transmission operation. As shown in FIG. 2, when the dowel pin 4 is inserted into the through aperture 2a, its inclined portion must be fully engaged with the mandrel 3 in order to force the mandrel 3 upward therefrom and press it tightly against the crank 2, which being raised, raises in turn the linked gear 1. As a result, an off-center condition exists in the transmission mechanism, and the assembly becomes unsteady with the gear 1 wabbling during rotation, rendering the gymnastic bicycle unstable. Therefore, not only is the revolving efficiency of the gymnastic bicycle reduced, but also the life expectancy of the transmission mechanism. Futhermore, the traditional metal gear is noisy, which is always bothersome to the rider and tends to lessen the interest of riding the bicycle.

SUMMARY OF THE INVENTION

It is accordingly a primary object of this invention to provide a transmission mechanism with a novel crank and plastic-moulded gear that overcomes the above-mentioned problems accompanying the prior art.

With the above and other objects in mind, the present invention provides a new transmission mechanism which comprises in combination: a crank body of which one end is adapted to connect with a pedal of a gymnastic bicycle and the other end is formed with a larger head portion having a horizontal penetrating hole provided in the center, an open slot vertically formed in the middle across the penetrating hole, and a pin hole horizontally located in the next side of the head portion in tangential relationship with the penetrating hole; an inside gearing member including an annular body structure with a through opening located in the center, similar in size to the penetrating hole of the crank head portion, a circular flange with a smaller diameter than that of the head portion formed at the lower end thereof, a pair of opposing side pieces at a predetermined height on the periphery of the head portion, and a pair of L-shaped positioning lugs formed on the head portion perpendicular to the side pieces; a plastic-moulded gear of wear-resistant material such as ABS plastics incorporated with the inside gearing member and coupled with the crank head portion by inserting the L-shaped positioning lugs into the open slot of the head portion with the through opening of the gearing member aligned with the penetrating hole of the crank head portion; a transmission mandrel with longitudinal notch at one side securing the plastic-moulded gear against the crank head portion through the penetrating hole thereof with the longitudinal notch of the mandrel running parallel to the pin hole of the crank head portion; and a push pin affixing the mandrel and the gear in position through the pin hole so that the plastic-moulded gear is perfectly engaged with the head portion of the crank without incurring any off-centered condition.

Other objects and advantages of the present invention will become clear from the following detailed description of a preferred embodiment when read in connection with the accompanying drawings.

BRIEF DESCRIPTION OF THE DRAWINGS

FIG. 8A is a side sectional view of the assembled transmission mechanism; and

FIG. 8B is a rear view of the assembled transmission mechanism shown in FIG. 8A.

DETAILED DESCRIPTION OF THE PREFERRED EMBODIMENT

Figure 2:
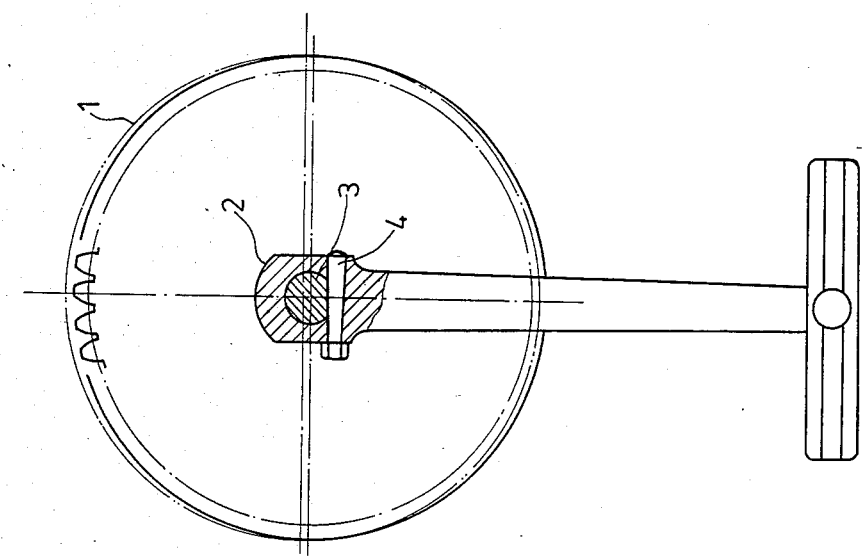
FIG. 2 is a partial rear sectional view of the transmission mechanism shown in FIG. 1.
Figure 1:
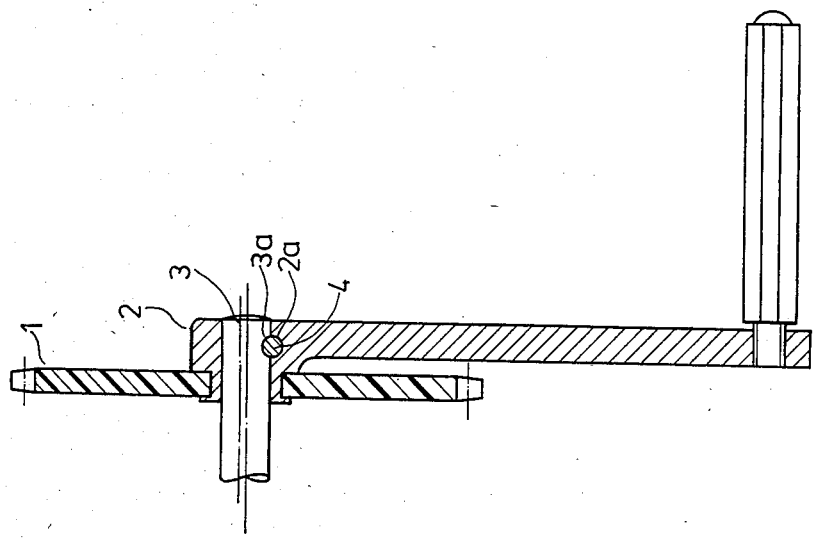
FIG. 1 is a side sectional view of a traditional transmission mechanism for a gymnastic bicycle.
Figure 4:
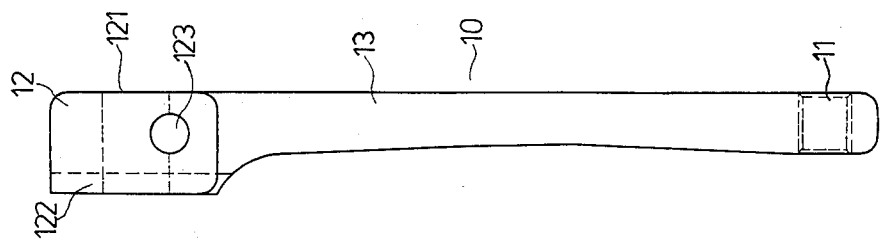
FIG. 4 is a side view of the crank portion shown in FIG. 3.
Figure 3:
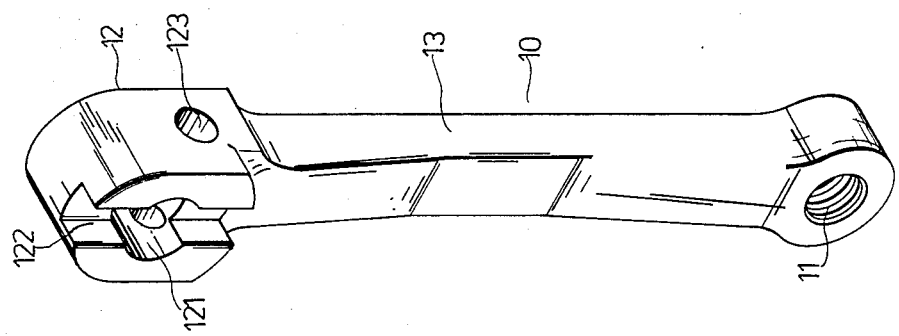
FIG. 3 is a perspective view of a preferred embodiment of a crank portion of a transmission mechanism according to the invention.

Referring to FIGS. 3 and 4, there is shown a preferred embodiment of a crank member 10 of the transmission mechanism according to this invention. The crank member 10 includes a screw opening 11 at one end for making connection with a pedal of the gymnastic bicycle, and a head portion 12 which is thicker than the rest of the crank 10. The head portion 12 is provided with a horizontal penetrating hole 121 in the center, an open slot 122 vertically formed across the penetrating hole 121, and a pin hole 123 horizontally penetrating the crank head portion 10 and perpendicular to the penetrating hole 121, with the central axis of the pin hole 123 tangential to the lower periphery of the penetrating hole 121 as shown in FIG. 4.

Figure 6:
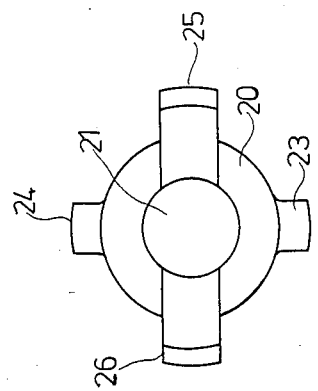
FIG. 6 is a top view of the inside gearing member shown in FIG. 5.
Figure 5:
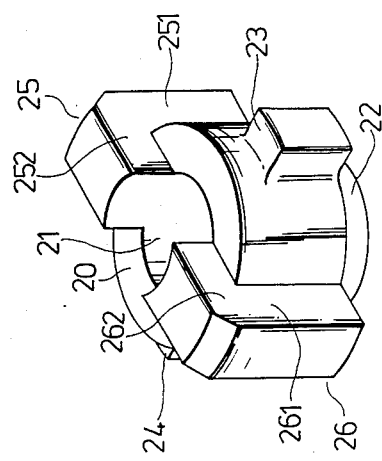
FIG. 5 is a perspective view of a preferred embodiment of an inside gearing member of the transmission mechanism according to this invention.

Referring to FIGS. 5 and 6, there is shown a preferred embodiment of an inside gearing member 20 of the transmission mechanism. The inside gearing member 20 comprises an annular body portion with a central through opening 21 whose diameter is the same as that of the penetrating hole 121 of the crank member 12, a circular flange 22 with a smaller diameter than that of the body portion provided around the lower end of the through opening 21 a pair of side pieces 22 and 24 opposing each other on the body portion at a predetermined height thereof, a pair of L-shaped positioning lugs 25 each having a vertical portion 251, 261 integrated with the side of the annular body portion 20 and a horizontal portion 252, 262 respectively curving over and integrated with the upper edge of the body portion.

Figure 7:
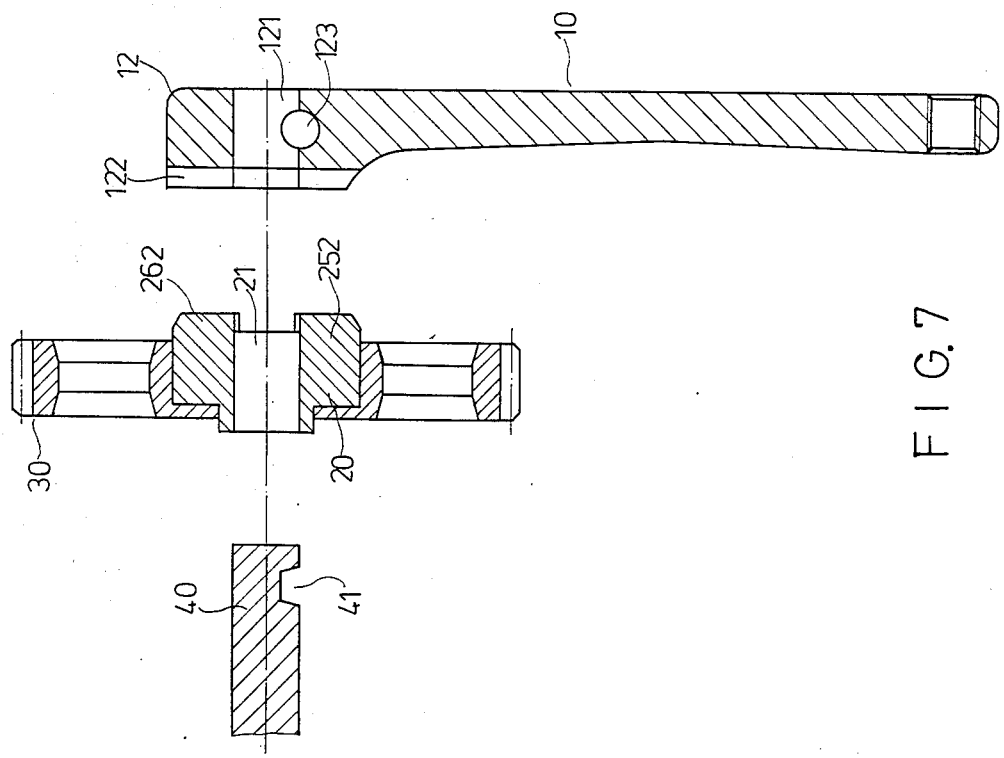
FIG. 7 is an exploded sectional view of the transmission mechanism according to this invention.

Referring to FIG. 7, a preferred embodiment of a transmission gear 30 of the transmission mechanism according to this invention is made of a wear-resistant plastics such as ABS plastic, and the assembly process is as follows: (1) setting the inside gearing member 20 in an outline moulding set of the transmission gear 30; (2) injecting molten plastic material into the outline moulding set with an injection forming machine; and (3) removing the moulded transmission gear 30 from the moulding set after the curing of the injected plastic material. As a result, the wear-resistant plastic material is firmly wrapped around the annular surface of the inside gearing member 20, leaving the through opening 21, the side pieces 23, 24 and the positioning lugs 25, 26 uncovered thereat, and becomes a single structure incorporated with the transmission gear 30, and, due to the arrangement of the side pieces 23, 24 and the L-shaped positioning lugs 25, 26, the transmission gear 30 is solidly stabilized and does not become wobbly and loose during its rotation. As for the teeth of the transmission gear 30, a standard tooth formation can be utilized and connected to either a toothed belt or a V-shaped belt as desired. In addition, a transmission mandrel 40 with an arcuate notch 41 longitudinally formed at one end and a push pin 50 are provided for connecting operations.

The assembly operations of the transmission mechanism according to this invention is shown in FIGS. 7 and 8 (A, B). First, the horizontal portions 252, 262 of the positioning lugs 25, 26 of the inside gearing member 20 are slid into the opening slot 122 of the crank head portion 12 with the penetrating hole 121 and the through hole 21 aligned therein; secondly, the transmission mandrel 40 is inserted into the aligned through hole 21 and the penetrating hole 121 of the crank head portion 12 with the arcuate notch 41 aligned with the pin hole 123; and finally, the push pin 50 is inserted deeply in the pin hole 123, passing through the arcuate notch 41 (as shown in FIG. 8A) so as to force the transmission mandrel 40 and the transmission gear 30 to be in rather tight contact with the crank head portion 12, accordingly completing a new transmission mechanism.

It shall be appreciated that when the push pin 50 is secured in the pin hole 123, the tightening pressure applied by the push pin 50 will force the crank head portion 12 merely to slide downward along the horizontal portions 252 and 262 of the positioning lugs 25 and 26 (as shown in FIG. 8A) without affecting the the position of the transmission mandrel 40. In other words, owing to the relative displacement of the crank head portion 12, the transmission gear 30 together with the inside gearing member 20 is always kept at its axis center without incurring any off-center condition during rotation of the crank transmission; therefore, there is no any unbalanced sway, and the bicycle is always kept in a stable state.

Having thus described the invention, it is to be understood that many embodiments thereof will suggest themselves without departing from the spirit and scope of the invention. Therefore, it is intended that the specification and drawings be interpreted as illustrative rather than in a limiting sense except as defined in the appending claims.

What I claim is:

1. A transmission mechanism comprising: a crank member having a screw opening at one end for making connection with a pedal-like element, and a head portion formed at another end, said head portion having a horizontal penetrating hole, an open slot vertically provided across said penetrating hole, and a pin hole horizontally formed in another side with a central axis tangentially crossing a lower periphery of said penetrating hole; a plastic-moulded transmission means having a central through opening connected to said head portion through said open slot with the through opening aligned with said penetrating hole; a transmission linking unit with an arcuate notch longitudinally formed at one end disposed in the aligned through opening and penetrating hole with the arcuate notch located in line with said pin hole; and a push pin member connected in said pin hole and securing said plastic-moulded transmission means and said transmission linking unit in firm position against the head portion of said crank member; whereby, said plastic-moulded transmission means mounted on the head portion of said crank member is always centered during rotation of the transmission mechanism, wherein said plastic-moulded transmission means comprises: an inside gearing member having an annular body portion, a central through opening formed in the body portion with a diameter similar to that of said penetrating hole of said crank head portion, a circular flange with a diameter smaller than that of the body portion located around a lower end of the through opening, a pair of side pieces opposing each other on the body portion at a pedetermined height thereof, a pair of L-shaped positioning lugs each having a vertical portion integrated with the body portion and extend in perpendicular direction to said side pieces, and each having a horizontal portion respectively curving over and integrated with an upper edge of the body portion; and a plastic transmission gear member disposed around the periphery of the annular body portion of said inside gearing member through an injection moulding operation with wear-resistant plastic material, so that said plastic transmission gear member and said inside gearing member are incorporated into a single solidified transmission unit which generates no noise and does not wobble and become loose from said crank member during rotation.

* * * * *